(12) United States Patent
Papazov et al.

(10) Patent No.: US 11,430,206 B1
(45) Date of Patent: Aug. 30, 2022

(54) BRANCH-AND-BOUND SEARCH ALGORITHM FOR 4D CAMERA LOCALIZATION

(71) Applicant: Apple Inc., Cupertino, CA (US)

(72) Inventors: Chavdar Chavdarov Papazov, Sunnyvale, CA (US); Lina Maria Paz-Perez, Santa Clara, CA (US); Oliver Thomas Ruepp, Baierbrunn (DE)

(73) Assignee: APPLE INC., Cupertino, CA (US)

( * ) Notice: Subject to any disclaimer, the term of this patent is extended or adjusted under 35 U.S.C. 154(b) by 135 days.

(21) Appl. No.: 16/829,300

(22) Filed: Mar. 25, 2020

Related U.S. Application Data

(60) Provisional application No. 62/834,769, filed on Apr. 16, 2019.

(51) Int. Cl.
*G06K 9/00* (2022.01)
*G06V 10/46* (2022.01)
*G06T 7/73* (2017.01)
*G06T 7/11* (2017.01)
*G06V 10/44* (2022.01)

(52) U.S. Cl.
CPC .............. *G06V 10/462* (2022.01); *G06T 7/11* (2017.01); *G06T 7/74* (2017.01); *G06V 10/44* (2022.01)

(58) Field of Classification Search
CPC ...... G06K 9/4671; G06K 9/4604; G06T 7/74; G06T 7/11
See application file for complete search history.

(56) References Cited

U.S. PATENT DOCUMENTS

| 8,798,357 B2* | 8/2014 | Sinha ................. G06K 9/00664 382/154 |
| 11,030,525 B2* | 6/2021 | Wang ......................... G06T 7/10 |

(Continued)

OTHER PUBLICATIONS

Mark Brown et al., "Globally Optimal 2D-3D Registration from Points or Lines Without Correspondences", Proceddings of the IEEE International Conference on Computer Vision, 2015, pp. 2111-2119.

Dylan Campbell et al., "Globally-Optimal Inlier Set Maximisation for Simultaneous Camera Pose and Feature Correspondence", Proceedings on the IEEE International Conference on Computer Vision, 2017, pp. 1-10.

(Continued)

*Primary Examiner* — Oneal R Mistry
(74) *Attorney, Agent, or Firm* — Fernando & Partners, LLP

(57) ABSTRACT

In some implementations, a method includes: extracting key-points from a reference image associated with a scene; generating a multi-cone structure including cones based on the key-points and intrinsic parameters, wherein an apex of the cones corresponds to a camera origin point associated with the reference image, and wherein each axis of the cones intersects a respective key-point; aligning the multi-cone structure based on a nominal alignment vector in order to restrict two rotational degrees of freedom; and determining a rigid transformation for the multi-cone structure, including a value for a remaining rotational degree of freedom and values for three translational degrees of freedom, within a search space associated with the scene, wherein a number of the cones within the multi-cone structure that include at least one point in a three-dimensional (3D) point cloud associated with the scene is maximal when the multi-cone structure is transformed by the rigid transformation.

23 Claims, 10 Drawing Sheets

(56) References Cited

U.S. PATENT DOCUMENTS

| | | | | |
|---|---|---|---|---|
| 2010/0111370 | A1* | 5/2010 | Black | G06Q 30/0601 705/26.1 |
| 2011/0273442 | A1* | 11/2011 | Drost | G06K 9/6211 345/419 |
| 2015/0235447 | A1* | 8/2015 | Abovitz | G01B 11/303 345/633 |
| 2016/0209846 | A1* | 7/2016 | Eustice | G06T 7/75 |
| 2017/0046833 | A1* | 2/2017 | Lurie | G06T 7/579 |
| 2018/0018787 | A1* | 1/2018 | Giancola | G06T 7/55 |
| 2018/0189578 | A1* | 7/2018 | Yang | G01C 21/32 |
| 2020/0043186 | A1* | 2/2020 | Selviah | G06K 9/6203 |

OTHER PUBLICATIONS

Konstantinos G. Derpanis, "Overview of the RANSAC Algorithm", Image Rochester, 4:1, 2010, pp. 1-2.

Yihong Wu et al., "Image-based camera localization: an overview", Visual Computing for Industry, Biomedicine, and Art, 1:18, 2018, pp. 1-13.

Jiaolong Yang et al., "Go-ICP: A Globally Optimal Solution to 3D ICP Point-Set Registration", IEEE transaction on pattern analysis and machine intelligence, 38. 11, 2015, pp. 1-14.

Yinqiang Zheng et al., "Revisting the PnP Problem: A Fast, General and Optimal Solution", Proceedings of the IEEE International Conference on Computer Vision, 2013, pp. 2344-2351.

* cited by examiner

Nominal alignment vector 375

BRANCH-AND-BOUND SEARCH ALGORITHM FOR 4D CAMERA LOCALIZATION

CROSS-REFERENCE TO RELATED APPLICATIONS

This application claims the benefit of U.S. Provisional Patent App. No. 62/834,769, filed on Apr. 16, 2019, which is incorporated by reference in its entirety.

TECHNICAL FIELD

The present disclosure generally relates to camera localization and, more specifically, to four-dimensional (4D) camera localization using a branch-and-bound (BNB) search algorithm.

BACKGROUND

Estimating six degrees of freedom (DOFs) associated with a camera pose from a single reference image relative to a three-dimensional (3D) point-set or point cloud is an important task for many computer vision use cases. Use cases may include camera localization and tracking, augmented reality, motion segmentation, object recognition, and the like. Perspective-n-Point (PNP) solvers are often used for camera pose estimation, provided that a good quality set of feature correspondences are known beforehand. While hypothesize-and-test frameworks, such as random sample consensus (RANSAC), can mitigate the sensitivity of PnP solvers to outliers in the correspondence set, few approaches are able to handle the case where 2D-3D correspondences are not known in advance. Unknown correspondences arise in many circumstances, including the general case of aligning an image with a 3D point-set or a textureless computer aided design (CAD) model. As such, finding optimal correspondences between two-dimensional (2D) key-points and the 3D point-set is non-trivial. Existing approaches to this simultaneous pose and correspondence problem use local optimization and are therefore unlikely to find the optimal solution without a pose prior or introduce restrictive assumptions.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
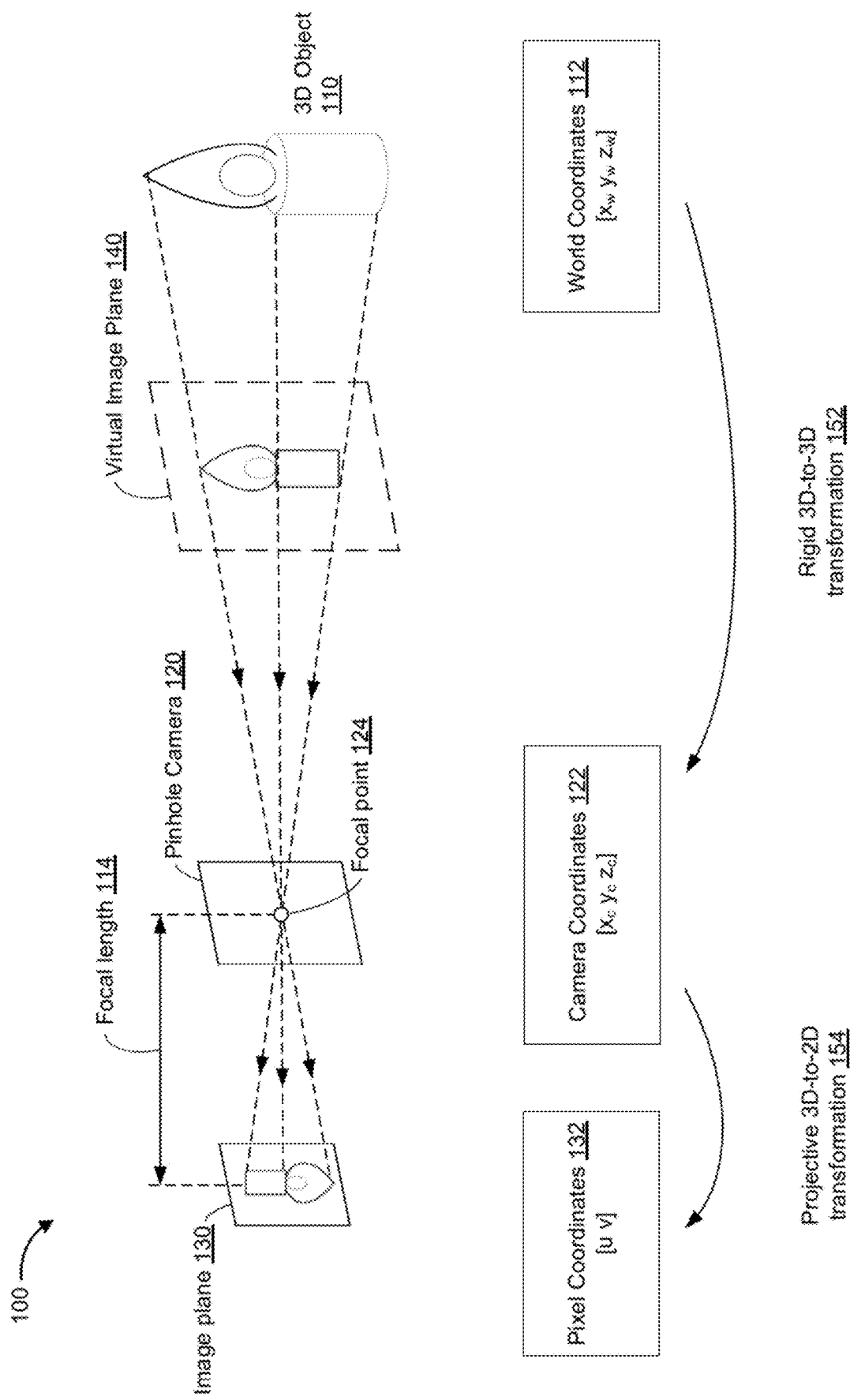
FIG. 1 is an illustrative diagram of an image capture architecture associated with a pinhole camera in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining a camera pose associated with a reference image based on a nominal alignment vector and a BNB search algorithm. In various implementations, a device includes a non-transitory memory and one or more processors coupled with the non-transitory memory. In some implementations, a method includes: extracting a plurality of key-points from a reference image associated with a scene; generating a multi-cone structure including a plurality of cones based on the plurality of key-points and intrinsic parameters associated with a camera that captured the reference image, wherein an apex of the plurality of cones corresponds to a camera origin point associated with the reference image, and wherein each axis of the plurality of cones intersects a respective key-point from the plurality of key-points; aligning the multi-cone structure based on a nominal alignment vector in order to eliminate two rotational degrees of freedom; and determining a rigid transformation for the multi-cone structure, including a value for a remaining rotational degree of freedom and values for three translational degrees of freedom, within a search space associated with the scene, wherein a number of the plurality of cones within the multi-cone structure that include at least one point in a 3D point cloud associated with the scene is maximal when the multi-cone structure is transformed by the rigid transformation.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Camera pose localization is an important computer vision problem for many applications such as simultaneous localization and mapping (SLAM), visual inertial odometry (VIO), object recognition, and the like. Camera pose localization includes determining three rotational degrees of freedom and three translational degrees of freedom for a camera pose based on a reference image of a scene and a 3D point cloud of the scene.

Nominal alignment to a known axis (e.g., gravity) helps to restrict two rotational degrees of freedom (e.g., pitch and roll) but leaves the remaining degree of rotational freedom (e.g., yaw) and three translational degrees of freedom unsolved. In various implementations, a multi-cone structure is generated that includes a plurality of cones based on a plurality of key-points within a reference image and intrinsic parameters associated with a camera that captured the reference image. An apex of the plurality of cones corresponds to a camera origin associated with the reference image, and each axis of the plurality of cones intersects a respective key-point from the plurality of key-points. The multi-cone structure is aligned based on a nominal alignment vector in order to restrict two rotational degrees of freedom. Finally, a rigid transformation for the multi-cone structure, including a value for a remaining rotational degree of freedom and values for three translational degrees of freedom, within a search space associated with the scene is determined, whereby a number of the plurality of cones within the multi-cone structure that include at least one point in a 3D point cloud associated with the scene is maximal when the multi-cone structure is transformed by the rigid transformation. As such, the rigid transformation gives a camera pose that can be used to recreate the reference image.

FIG. 1 is an illustrative diagram of an image capture architecture 100 associated with a pinhole camera in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 1, the image capture architecture 100 includes a 3D object 110 in a 3D world scene. The 3D object is associated with 3D world coordinates 112 $[x_w\ y_w\ z_w]$. The image capture architecture 100 also includes a pinhole camera 120 with a focal point 124. The pinhole camera 120 is associated with 3D camera coordinates 122 $[x_c\ y_c\ z_c]$. The image capture architecture 100 further includes an image plane 130 separated from the focal point 124 of the pinhole camera 120 by a focal length 114. The image plane 130 (or features thereon) is associated with 2D pixel coordinates 132 $[u\ v]$.

According to some implementations, the pinhole camera 124 is a simple camera without a lens and with a single small aperture (e.g., the focal point 124). Light rays pass through the aperture and project an inverted image onto the image plane 130 on the opposite side of the pinhole camera 124. According to some implementations, a virtual image plane 140 is illustrated for ease of reference as being in front of the pinhole camera 124 with an upright image of the 3D world scene.

The pinhole camera parameters are represented by a camera matrix, which is shown below as equation (1). The camera matrix maps the 3D world scene into the image plane 130. The camera matrix includes both extrinsic and intrinsic parameters. The extrinsic parameters represent the location of the pinhole camera 120 in the 3D scene (e.g., the 3D camera coordinates 122). The intrinsic parameters represent the focal point 124 (e.g., the optical center or aperture) and the focal length 114 of the pinhole camera 120. In other words, the camera matrix is used to denote a projective mapping from the 3D world coordinates 112 to the 2D pixel coordinates 132.

$$z_c \begin{bmatrix} u \\ v \\ 1 \end{bmatrix} = K[R\ T] \begin{bmatrix} x_w \\ y_w \\ z_w \\ 1 \end{bmatrix} \quad (1)$$

$[u\ v\ 1]^T$ represents a 2D point in the 2D pixel coordinates 132, and $[x_w\ y_w\ z_w\ 1]^T$ represents a 3D point position in the 3D world coordinates 112. Both are expressed in the augmented notation of homogeneous coordinates, which is the most common notation in robotics and rigid body transforms.

The intrinsic parameters are represented by the intrinsic matrix K, which is shown below as equation (2). The parameters $\alpha_x = f \cdot m_x$ and $\alpha_y = f \cdot m_y$ represent focal length in terms of pixels, where $m_x$ and $m_y$ are scale factors relating pixels to distance and f is the focal length 114 in terms of distance. $\gamma$ represents a skew coefficient between the x- and y-axis and is often 0. $u_0$ and $v_0$ represent the principal point.

$$K = \begin{bmatrix} \alpha_x & \gamma & u_0 & 0 \\ 0 & \alpha_y & v_0 & 0 \\ 0 & 0 & 1 & 0 \end{bmatrix} \quad (2)$$

The extrinsic parameters are represented by the extrinsic matrix [R T], which is shown below as equation (3). $R_{3\times3}$ is sometimes referred to as the rotation matrix, and $T_{3\times1}$ is sometimes referred to as the translation vector. [R T] encompasses the extrinsic parameters, which denote coordinate system transformations from the 3D world coordinates 112 to the 3D camera coordinates 122. Equivalently, the extrinsic parameters define the position of the camera center and the camera's heading in the 3D world coordinates 112. T is the position of the origin of the world coordinate system expressed in coordinates of the camera-centered coordinate system.

$$[R\ T]_{4\times4} = \begin{bmatrix} R_{3\times3} & T_{3\times1} \\ 0_{1\times3} & 1 \end{bmatrix} \quad (3)$$

As such, according to some implementations, a rigid 3D-to-3D transformation 152 from the 3D world coordinates 112 to the 3D camera coordinates 122 (or vice versa) exists based on extrinsic parameters associated with three rotational degrees of freedom (DOFs) and three translational DOFs (e.g., the extrinsic matrix [R T]). According to some implementations, a projective 3D-to-2D transformation 154 from the set of camera coordinates 122 to the 2D pixel coordinates 132 (or vice versa) exists based on the intrinsic parameters associated with the pinhole camera 124 (e.g., the intrinsic matrix K).

Figure 2:
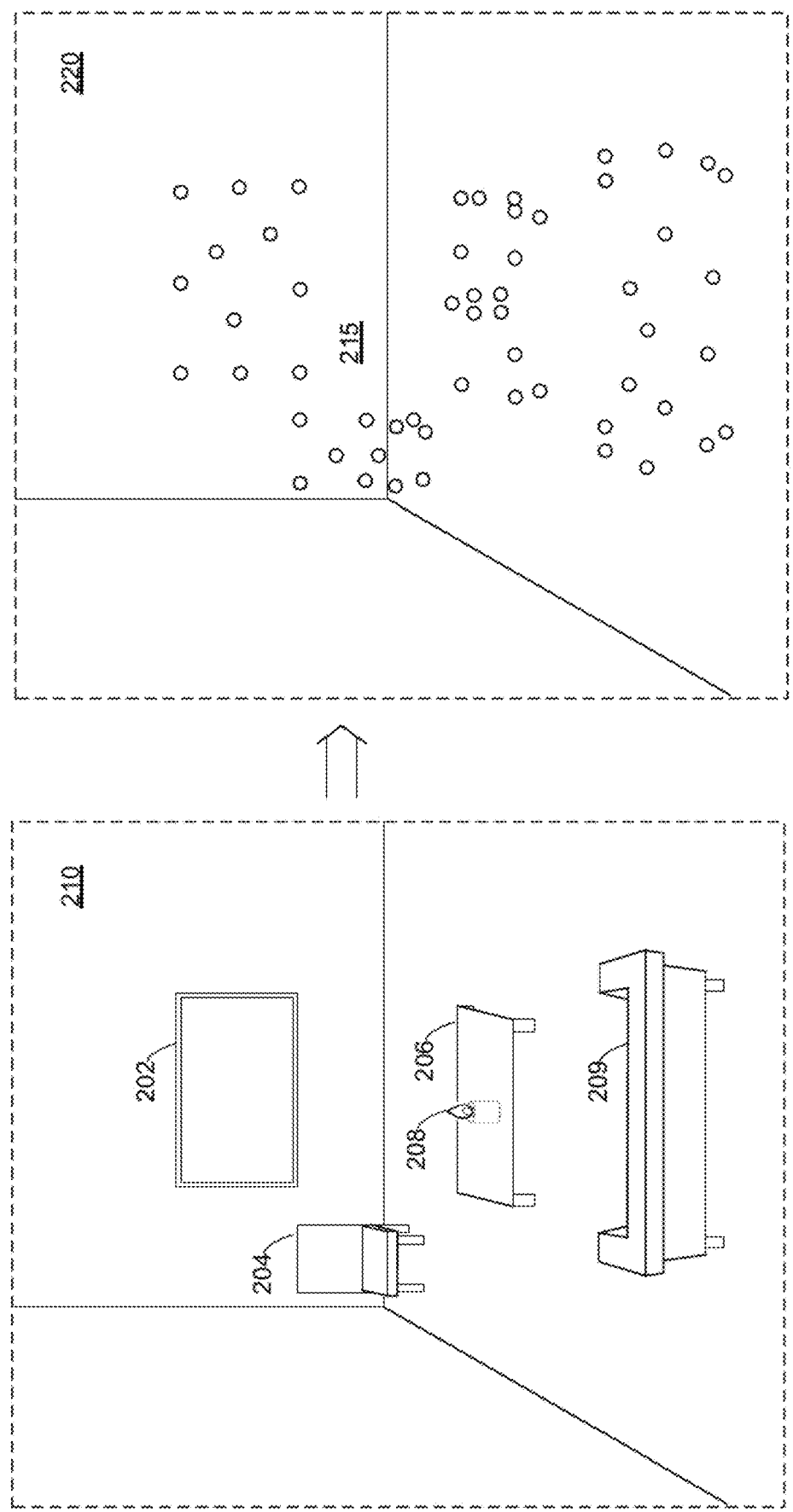
FIG. 2 illustrates an example 3D scene and an associated example 3D point cloud in accordance with some implementations.

FIG. 2 illustrates an example 3D scene 210 and an associated example 3D point cloud 215 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 2, a 3D scene 210 includes a plurality of real-world objects such as a television 202, a chair 204, a table 206, a candle 208, and a couch 209. According to some implementations, a 3D point cloud 215 is generated based on a plurality of images of the 3D scene 210. Moreover, the 3D point cloud 215 is displayed overlaid on a representation of the 3D scene 220 without the plurality of real-world objects. One of ordinary skill in the art will appreciate how to generate the 3D point cloud 215 based on a plurality of images of the 3D scene 210 and techniques therefor will not be described herein for the sake of brevity.

A world point cloud, V, (e.g., associated with the 3D point cloud 215 in FIG. 2) is denoted below as equation (4), wherein $\{p_j\}$ represents the set of points in the world point cloud.

$$\mathcal{W} = \{p_j\}_{j=1}^{m} \subset \mathbb{R}^3 \qquad (4)$$

Figure 3A:
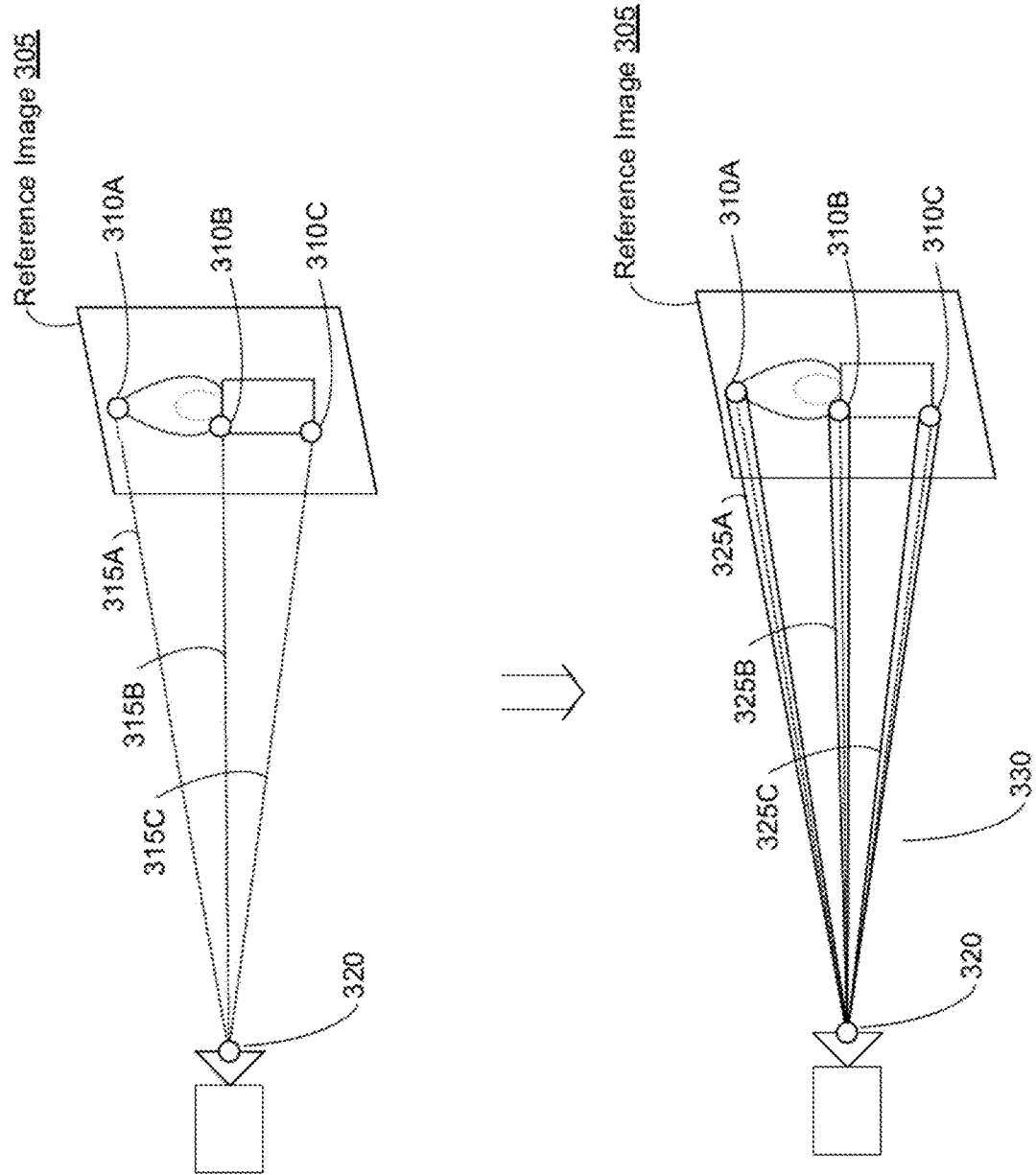
FIG. 3A illustrates a process for determining a camera origin based on key-points in a reference image and generating a multi-cone structure therefrom in accordance with some implementations.

FIG. 3A illustrates a process for determining a camera origin 320 (e.g., a point) based on key-points 310 in a reference image 305 and generating a multi-cone structure 330 therefrom in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 3A, assuming a calibrated camera, key-points 310A, 310B, and 310C (sometimes also collectively referred to as the key-points 310) are identified within the reference image 305. For example, the key-points 310 correspond to features extracted from the reference image 305 (e.g., corners, edges, or the like). One of ordinary skill in the art will appreciate how to the extract key-points 310 from the reference image 305 and techniques therefor will not be described herein for the sake of brevity.

The key-points 310 are denoted below in equation (5) as set $\mathcal{K}$.

$$\mathcal{K} = \{u_i = (u_i, v_i, 1)\}_{i=1}^{n} \subset \mathbb{R}^3 \qquad (5)$$

As shown in FIG. 3A, unit-length vectors 315A, 325B, and 315C (sometimes also collectively referred to as the unit-length vectors 315) are generated based on the key-points 310 within the reference image 305. According to some implementations, the unit-length vectors 315 are used along with the intrinsic parameters to determine a camera origin 320 (e.g., the optical center or aperture) relative to an image plane associated with the reference image 305.

The $i^{th}$ unit-length vector $r_i$, denoted below in equation (6), corresponds to the $i_{th}$ key-point within the reference image 305.

$$r_i = \frac{u_i}{\|u_i\|} \qquad (6)$$

As shown in FIG. 3A, a multi-cone structure 330 including cones 325A, 325B, and 325C (sometimes also collectively referred to as the cones 325) is generated based on the unit-length vectors 315 and the camera origin 320. An apex of the cones 325 corresponds to the camera origin 320. An axis of the cone 325A corresponds to the unit-length vector 315A, an axis of the cone 325B corresponds to the unit-length vector 315B, and an axis of the cone 325C corresponds to the unit-length vector 315C. As such, the cone 325A intersects (or contains) the key-point 310A, the cone 325B intersects (or contains) the key-point 310B, and the cone 325B intersects (or contains) the key-point 310B. As such, in some implementations, the cones 326 are infinitely long.

The $i^{th}$ cone, $C_i$, is denoted below in equation (7). $C_i$ is associated with the $i^{th}$ unit-length vector $r_i$. As such, $C_i$ has an axis $r_i$ and an aperture $2\alpha \in (0, \pi)$.

$$C_i = \{x \in \mathbb{R}_3 | <(x, r_i) \le \alpha\} \qquad (7)$$

Figure 3B:
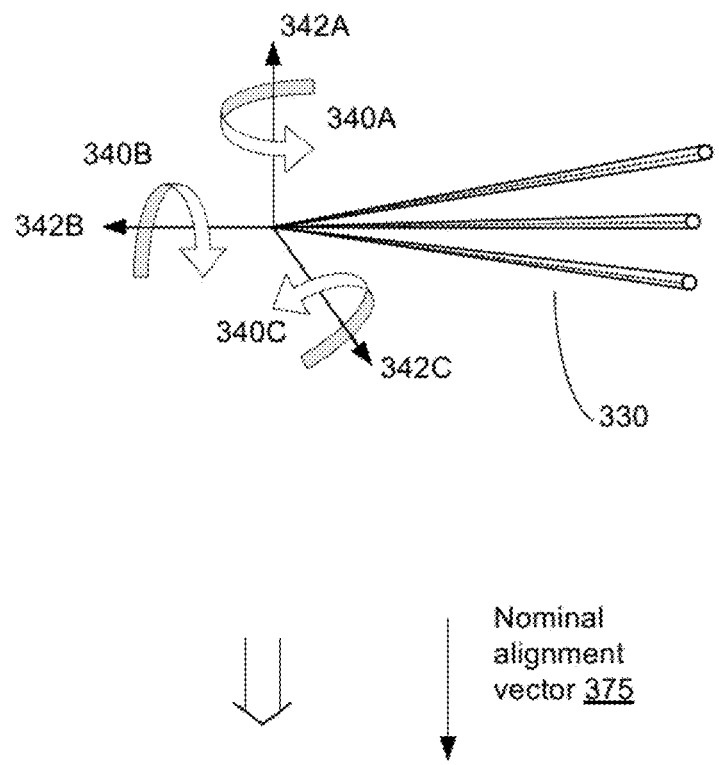
FIG. 3B illustrates a process for reducing rotational DOFs associated with the multi-cone structure in FIG. 3A in accordance with some implementations.
Figure 3B:
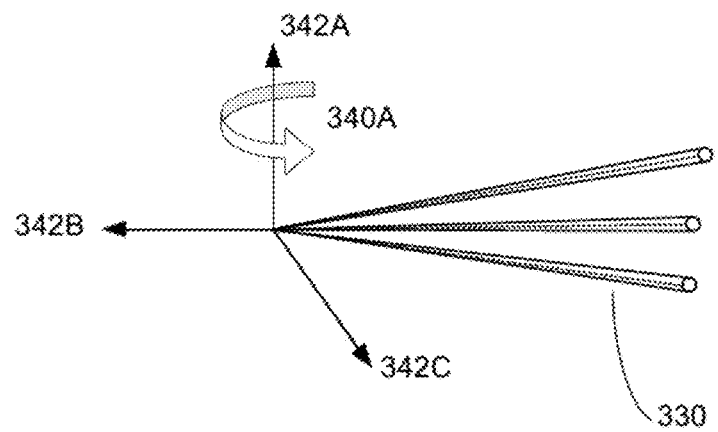

FIG. 3B illustrates a process for reducing rotational degrees of freedom (DOF) associated with the multi-cone structure 330 in FIG. 3A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The optimization problem to be solved is to find a rigid transformation for the multi-cone structure 330 defined by $(R \in SO(3), t \in \mathbb{R}^3)$ such that the number of transformed cones that contain at least one point from IV is maximal. This problem has 6 DOFs—three for rotation and three for translation. As shown in FIG. 3B, the multi-cone structure 330 is associated with rotational DOFs 340A, 340B, and 340C and translational DOFs 342A, 342B, and 342C.

Two rotational DOFs (342B and 342C) can be eliminated by aligning the multi-cone structure 330 to a nominal alignment vector 375. In some implementations, the nominal alignment vector 375 corresponds to any a priori axis (e.g., a known axis if gravity is not present). In some implementations, the nominal alignment vector 375 corresponds to the world gravity vector $g_w$. For example, $g_w$ is determined based on sensor data from various input devices such as an accelerometer, gyroscope, inertial measurement unit (IMU), and/or the like. In another example, $g_w$ is determined by analyzing image data based on various computer vision techniques (e.g., identifying horizontal lines or the horizon within images). One of ordinary skill in the art will appreciate how to determine $g_w$ and techniques therefor will not be described herein for the sake of brevity.

Let $g_w, g_c \in \mathbb{R}^3$ denote the unit-length gravity vectors in world and camera coordinates, respectively. Since $g_w$ and $g_c$ are known, a rotation matrix $Q \in SO(3)$ can be computed that aligns $g_w$ and $g_c$. More precisely, Q satisfies $$g_w = Q g_c. \qquad (8)$$

This transformation is unique up to a rotation by an angle $\theta \in (0, 2\pi)$ around $g_w$. In other words, Q accounts for two of the three rotational DOFs. As such, a rigid transformation for the multi-cone structure 330 is solved for the remaining rotation parameter $\theta$ together with the unknown camera position t. Thus, the camera pose is given by the rigid transformation (R, t), with $$R = R_\theta Q, \quad (9)$$

where $R_\theta$ is the matrix that implements rotation by the angle $\theta$ around $g_w$.

As such, the key-point vectors $r_i$ as pre-aligned by Q as $$r_i \leftarrow Q r_i. \quad (10)$$

Therefore, when solving the rigid transformation (R, t), the multi-cone structure 330 is also pre-aligned by virtue of the pre-aligned key-point vectors $r_i$.

Figure 4A:
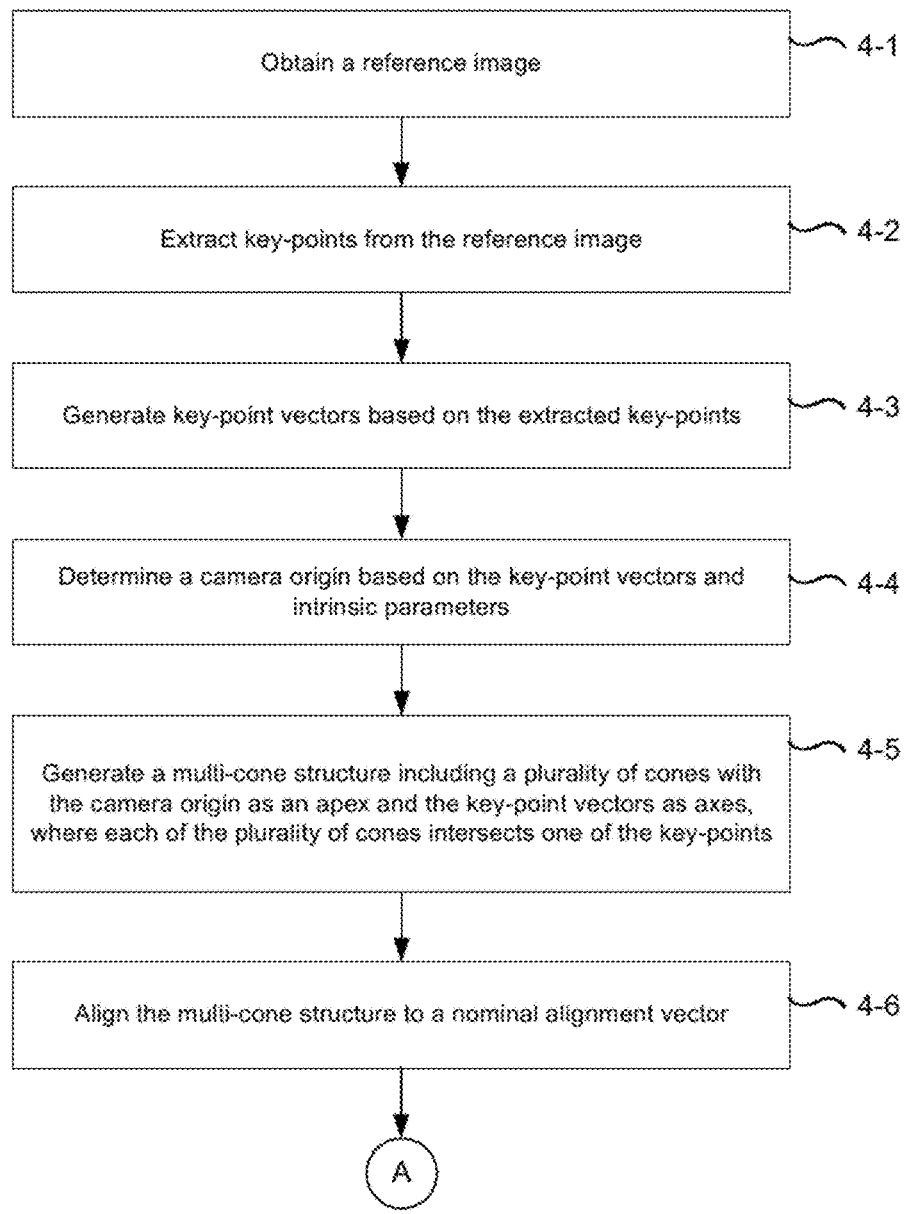
FIGS. 4A and 4B illustrate a flowchart representation of a method 400 of finding an optimal rigid transformation in accordance with some implementations.
Figure 4B:
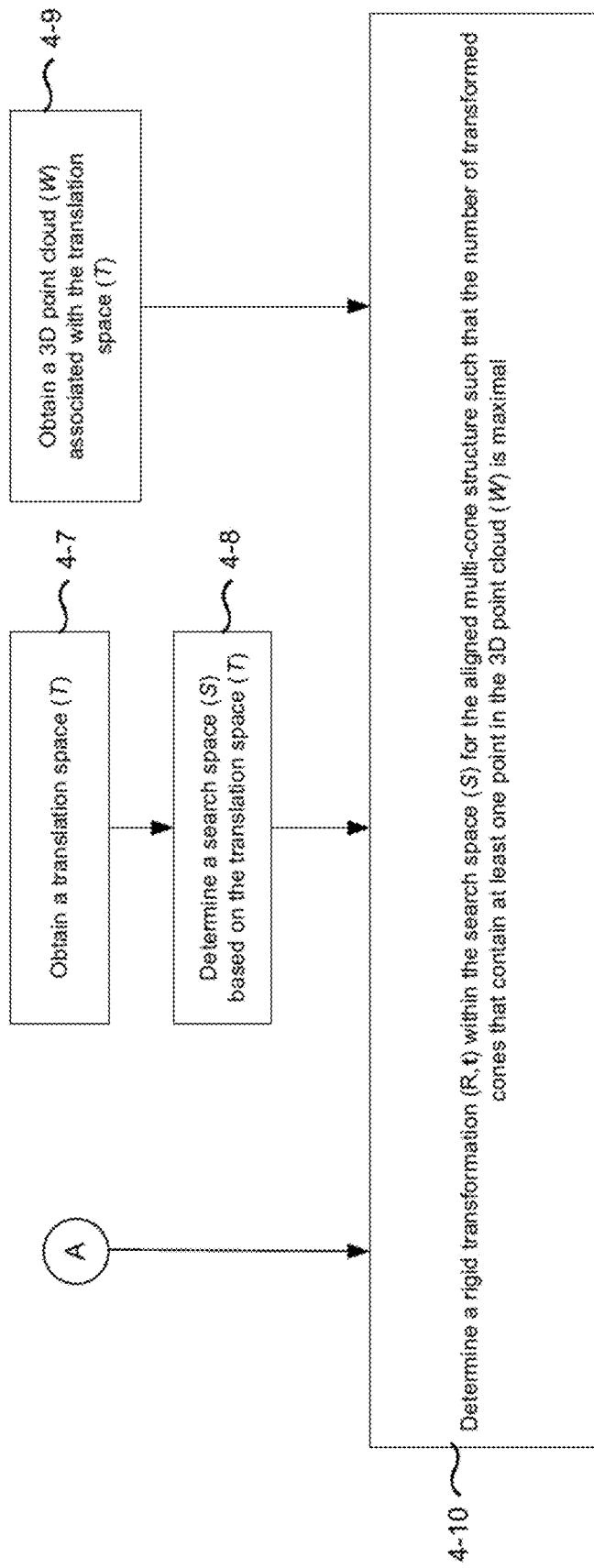

FIGS. 4A and 4B illustrate a flowchart representation of a method 400 of finding an optimal rigid transformation in accordance with some implementations. In various implementations, the method 400 is performed by a device with a non-transitory memory and one or more processors coupled with the non-transitory memory (e.g., the device 700 in FIG. 7). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 4-1, in various implementations, the method 400 includes obtaining a reference image. As one example, with reference to FIG. 3A, the device obtains the reference image 305 by receiving the reference image 305 from a remote or local source. As another example, with reference to FIG. 3A, the device obtains the reference image 305 by retrieving the reference image 305 from a remote or local source. As yet another example, the device obtains the reference image 305 by capturing the reference image 305 using an exterior-facing image sensor. For example, the device corresponds to a mobile phone, tablet, laptop, wearable computing device, head-mounted device (HMD), or the like.

As represented by block 4-2, in various implementations, the method 400 includes extracting key-points from the reference image. For example, the key-points correspond to features such as corners, edges, lines, and/or the like. As one example, with reference to FIG. 3A, the device extracts the key-points 310 from the reference image 305.

As represented by block 4-3, in various implementations, the method 400 includes generating key-point vectors based on the extracted key-points. As one example, with reference to FIG. 3A, the device generates the unit-length vectors 315 for the key-points 310.

As represented by block 4-4, in various implementations, the method 400 includes determining a camera origin (e.g. a point such as the camera aperture or optical center) based on the key-point vectors and intrinsic parameters of the camera that captured the reference image. As one example, with reference to FIG. 3A, the device determines the camera origin 320 based on the unit-length vectors 315 and intrinsic parameters for the camera that captured the reference image 305. For example, the intrinsic parameters are known a priori. As described above with reference to equation (2), the intrinsic parameters are denoted by the intrinsic matrix K.

As represented by block 4-5, in various implementations, the method 400 includes generating a multi-cone structure including a plurality of cones with the camera origin as an apex and the key-point vectors as axes, where each axis of the plurality of cones passes through (or intersects) one of the key-points. As one example, with reference to FIG. 3A, the device generates the multi-cone structure 330 including the cones 325 based on the unit-length vectors 315 and the camera origin 320. As one example, with reference to FIG. 3A, each of the axes of the cones 325 intersects one of the key-points 310.

As represented by block 4-6, in various implementations, the method 400 includes aligning the multi-cone structure to a nominal alignment vector. As one example, with reference to FIG. 3B, the device aligns the multi-cone structure 330 to the nominal alignment vector 375 (e.g., the world gravity vector $g_w$) in order to eliminate rotational DOFs 340B and 340C.

As represented by block 4-7, in various implementations, the method 400 includes obtaining a translation space $\mathcal{T}$. According to some implementations, the device determines rough location estimates for the translation space $\mathcal{T}$ based on location data (e.g., GPS, WiFi, SLAM, etc.) or metadata associated with the reference image. For example, the translation space $\mathcal{T}$ is associated with an N meter radius from an origin defined by GPS coordinates associated with the reference image. As such, the translation space $\mathcal{T}$ is restricted to a 3D super-interval, where $$\mathcal{T} = [x_{min}, x_{max}] \times [y_{min}, y_{max}] \times [z_{min}, z_{max}] \subset \mathbb{R}^3. \quad (11)$$

As represented by block 4-8, in various implementations, the method 400 includes determining a search space $\mathcal{S}$, denoted below in equation (12), based at least in part on the translation space $\mathcal{T}$ defined above in equation (11).

$$s = [0, 2\pi] \times \mathcal{T} \quad (12)$$

As represented by block 4-9, in various implementations, the method 400 includes obtaining a 3D point cloud $\mathcal{W}$ associated with the translation space $\mathcal{T}$. As one example, with reference to FIG. 2, assuming the translation space $\mathcal{T}$ is associated with the 3D scene 210, the device obtains the 3D point cloud 215 for the 3D scene 210.

As represented by block 4-10, in various implementations, the method 400 includes determining a rigid transformation (R, t) within the search space $\mathcal{S}$ for the aligned multi-cone structure such that the number of transformed cones that contain at least one point in the 3D point cloud $\mathcal{W}$ is maximal. In other words, with reference to FIGS. 2, 3A, and 3B, a rigid transformation (R, t) is found for the multi-cone structure 330 such that the number of cones within the multi-cone structure 330 that contain at least point in the 3D point cloud 215 is maximal. As such, continuing with this example, the 2D key-points 310 within the reference image 305 are registered to corresponding 3D points in the 3D point cloud 215 (e.g., 3D points associated with the candle 208). For example, the rigid transformation (R, t) corresponds to the camera pose associated with the reference image. Therefore, the reference image 305 can be recreated based on the rigid transformation (R, t).

According to some implementations, a branch-and-bound (BNB) search algorithm is employed over the search space $\mathcal{S}$ in order to find a global maximum for the objective function outlined below. In other words, the BNB search algorithm is used to find the rigid transformation (R, t) within the search space $\mathcal{S}$. This BNB search algorithm is described in more detail below with reference to method 500 in FIG. 5.

The objective function is defined below in equations (13) and (14):

$$(\theta^*, t^*) = \underset{\theta \in [0,2\pi], t \in \mathcal{T}}{\text{argmax}} f(\theta, t) \quad (13)$$

$$f(\theta, t) = \sum_{i=1}^{n} \max_{p \in \mathcal{W}} 1_{\{R_\theta C_i + t\}}(p), \quad (14)$$

where $1_A$ is the indicator function $$1_A(x) = \begin{cases} 1 & \text{if } x \in A \\ 0 & \text{if } x \notin A \end{cases} \quad (15)$$

and $R_\theta C_i + t$ is the cone $C_i$ transformed by $(R_\theta, t)$:

$$R_\theta C_i + t = \{R_\theta x + t | x \in C_i\}. \quad (16)$$

Figure 5:
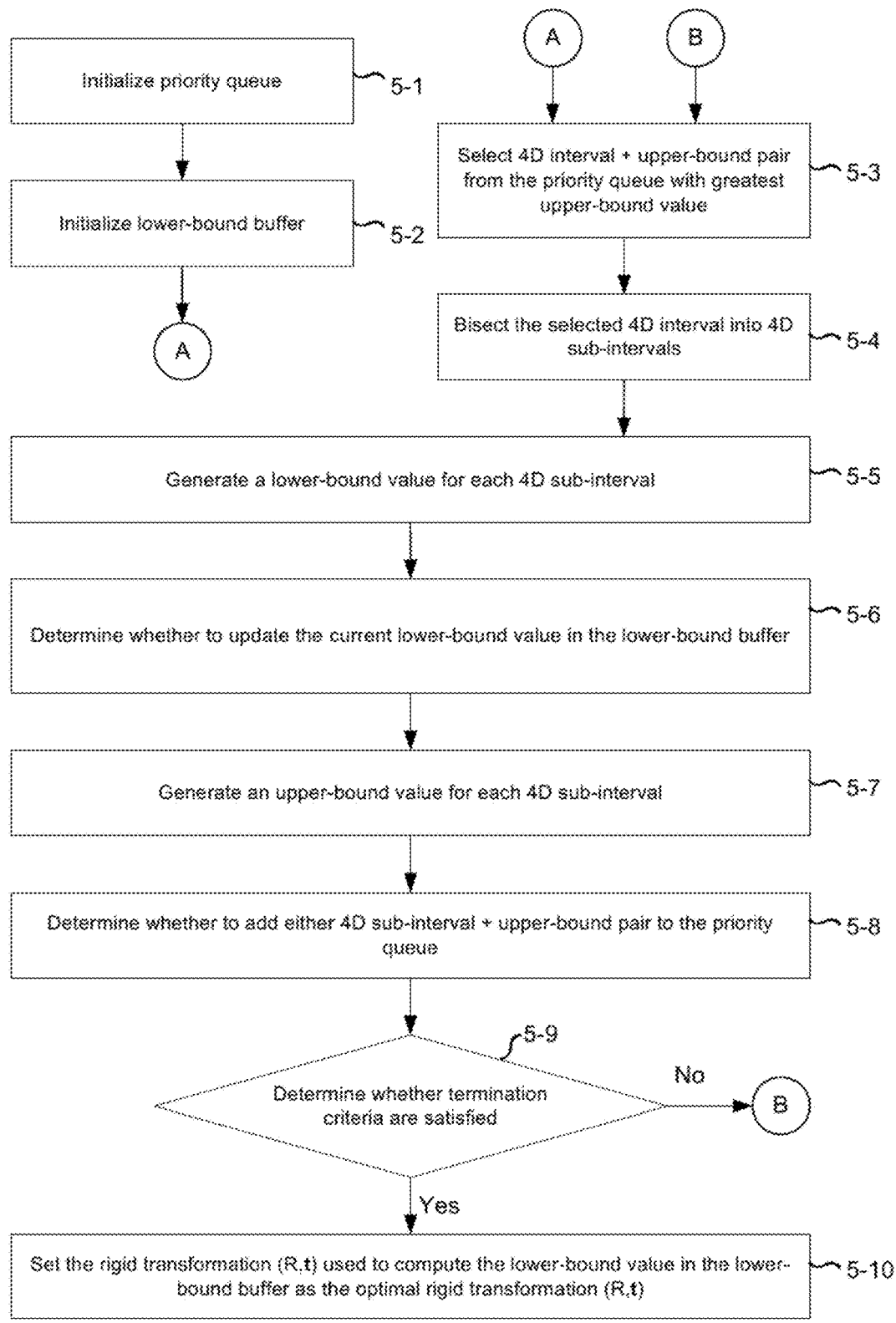
FIG. 5 is a flowchart representation of a branch-and-bound (BNB) search algorithm for finding an optimal rigid transformation in accordance with some implementations.

FIG. 5 is a flowchart representation of a branch-and-bound (BNB) search algorithm 500 for finding an optimal rigid transformation in accordance with some implementations. In various implementations, the method 500 is performed by a device with a non-transitory memory and one or more processors coupled with the non-transitory memory (e.g., the device 700 in FIG. 7). In some implementations, the method 500 is performed by processing logic, including hardware, firmware, software, or a combination thereof. In some implementations, the method 500 is performed by a processor executing code stored in a non-transitory computer-readable medium (e.g., a memory).

According to some implementations, to run the BNB search algorithm, the device computes upper- and lower-bounds on the maximum of f over arbitrary 4D intervals of the search space S. More precisely, given a respective interval I, where $$I = \underbrace{[\theta_0, \theta_1]}_{\subseteq [0,2\pi]} \times \underbrace{[x_0, x_1] \times [y_0, y_1] \times [z_0, z_1]}_{\subseteq \mathcal{T}} \subseteq \mathcal{S}, \quad (17)$$

the device computes an integer value upper-bound, $f_{up}(I)$, which satisfies $$f_{up}(I) \geq \max_{(\theta, t) \in I} f(\theta, t). \quad (18)$$

The upper-bound computation is described in more detail below with reference to FIGS. 6A and 6B.

Furthermore, the device computes an integer value lower-bound, $f_{low}(I)$, by setting $f_{low}(I) = f(\theta', t')$ for an arbitrary $(\theta', t') \in I$. The device selects the midpoint of I as $(\theta', t')$. As such, it holds that $$f_{low}(I) = f(\theta', t') \leq \max_{(\theta, t) \in I} f(\theta, t). \quad (19)$$

In order for the upper- and lower-bounds to be useful, $f_{up}$ and $f_{low}$ should become tighter and converge to the maximum as the size of I approaches 0. In other words, $$\lim_{vol(I) \to 0} f_{low}(I) = \lim_{vol(I) \to 0} f_{up}(I) = \max_{\substack{(\theta, t) \in I \\ vol(I) \to 0}} f(\theta, t). \quad (20)$$

As represented by block 5-1, in various implementations, the method 500 includes initializing a priority queue. According to some implementations, the priority queue includes pairs of $(I, f_{up}(I))$. In some implementations, the priority queue is initialized by inserting $(\mathcal{S}, f_{up}(\mathcal{S}))$ into the priority queue.

As represented by block 5-2, in various implementations, the method 500 includes initializing a lower-bound buffer. According to some implementations, the lower-bound buffer includes the highest lower-bound value $f^*_{low}$ computed up to the current iteration. In some implementations, the lower-bound buffer is initialized by setting $f^*_{low} = f_{low}(\mathcal{S})$.

As represented by block 5-3, in various implementations, the method 500 includes selecting a 4D interval+upper-bound pair from the priority queue with the highest upper-bound value and removing the selected 4D sub-interval+upper-bound pair from the priority queue.

As represented by block 5-4, in various implementations, the method 500 includes bisecting the selected 4D interval I at the midpoint of the longest 1D sub-interval of I relative to its original size. According to some implementations, the device computes the length of each 1D sub-interval as a percentage of its original size because the rotational dimension has a different scale than the three translational dimensions. For example, the length of $[0, \pi/2]$ is 25% as it is ¼ of the original whole rotational interval $[0, 2\pi]$. Therefore, all dimensions are treated equally and nested octrees are not used in the BNB search algorithm described herein. As such, the search space S is managed without a spatial data structure as the intervals are stored in the priority queue. One of ordinary skill in the art will appreciate that the 4D interval may be divided into N sub-portions, in various other implementations, instead of merely being bisected.

As represented by block 5-5, in various implementations, the method 500 includes generating lower-bound values $f_{low}(I_k)$ for k=0, 1 associated with the sub-intervals $I_0$ and $I_1$.

As represented by block 5-6, in various implementations, the method 500 includes determining whether to update the lower-bound value $f^*_{low}$ in the lower-bound buffer. In other words, the device sets $$f^*_{low} \leftarrow \max\{f^*_{low}, f_{low}(I_0), f_{low}(I_1)\}. \quad (21)$$

As represented by block 5-7, in various implementations, the method 500 includes generating upper-bound values $f_{up}(I_k)$ for k=0, 1 associated with the sub-intervals $I_0$ and $I_1$. The upper-bound computation is described in more detail below with reference to FIGS. 6A and 6B.

As represented by block 5-8, in various implementations, the method 500 includes determining whether to add either 4D sub-interval+upper-bound pair to the priority queue based on the following:

(i) insert $(I_k, f_{up}(I_k))$ in the priority queue if $f_{up}(I_k) \geq f^*_{low}$ or (ii) ignore the interval $I_k$ altogether if $f_{up}(I_k) \leq f^*_{low}$.

As represented by block 5-9, in various implementations, the method 500 includes determining whether termination criteria are satisfied. In some implementations, the termination criteria are satisfied when:

(A) at some iteration $f^*_{low} = f_{up}(I)$, where $f_{up}(I)$ belongs to the 4D sub-interval+upper-bound pair in the priority queue with the greatest upper-bound value; or (B) the priority queue is empty.

If the termination criteria are satisfied ("Yes" branch from block 5-8), the method 500 continues to block 5-10. If the termination criteria are not satisfied ("No" branch from block 5-8), the method 500 continues to block 5-3.

As represented by block 5-10, in various implementations, the method 500 includes setting the rigid transformation used to compute $f^*_{low}$, as the optimal rigid transformation (R, t). As such, the optimal rigid transformation (R, t) gives a camera pose with a maximal number of cones containing at least one world point in W.

Figure 6A:
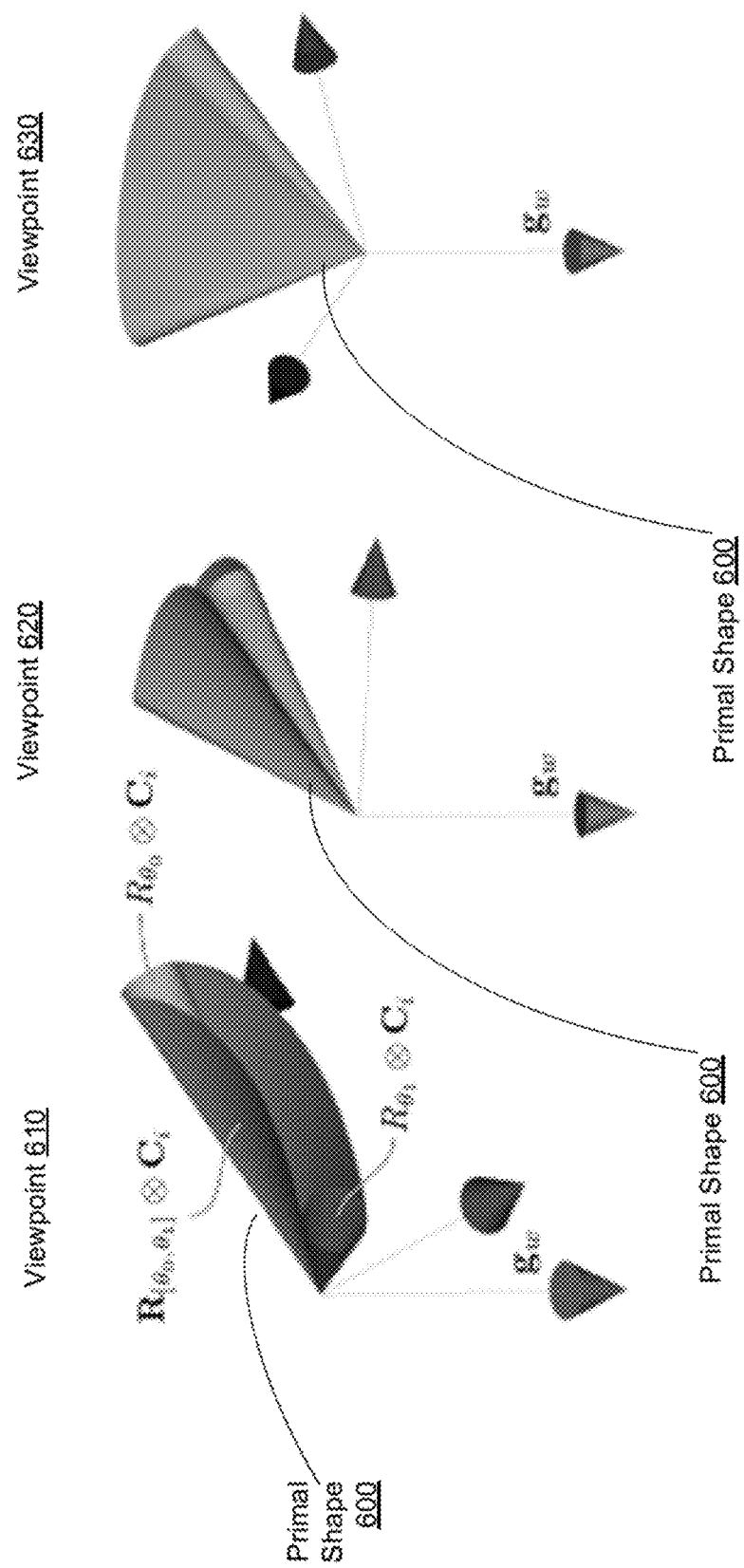
FIG. 6A illustrates a primal shape used to compute an upper-bound for the BNB search algorithm in FIG. 5 from various viewpoints in accordance with some implementations.

FIG. 6A illustrates a primal shape 600 used to compute an upper-bound for the BNB search algorithm 500 in FIG. 5 from various viewpoints in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As mentioned above, the BNB search algorithm computes upper-bounds on f over arbitrary 4D intervals $I \subseteq S$. To simplify subsequent calculations, equation (14) is rewritten as $$f(\theta, t) = \sum_{i=1}^{n} f_i(\theta, t), \quad (22)$$

with $$f_i(\theta, t) = \max_{p \in W} 1_{\{R_\theta C_i + t\}}(p). \quad (23)$$

Let the maximum of equation (23) over I be denoted by $$f_{i,up}(I) = \max_{(\theta,t) \in I} f_i(\theta, t). \quad (24)$$

By summing up equation (24) over all cones in the multi-cone structure 330, an upper-bound on f over I is given as $$f_{up}(I) = \sum_{i=1}^{n} f_{i,up}(I). \quad (25)$$

$f_i(\theta, t) = 1$ if there is at least one world point contained in the cone $C_i$ transformed by $(\theta, t)$. More precisely, $$f_i(\theta, t) = \max_{p \in W} 1_{\{R_\theta C_i + t\}}(p) = \begin{cases} 1 & \text{if } \exists\, p \in W \text{ with } p \in R_\theta C_i + t \\ 0 & \text{otherwise,} \end{cases} \quad (26)$$

where $R_\theta C_i + t$ is the transformed version of cone $C_i$ as defined by equation (16) above.

Computing $f_{i,up}(I)$, that is the max of $f_i(\theta, t)$ over I, is equivalent to computing a $\mathcal{P}_i(I)$ generated by continuously transforming $C_i$ by all transformations of I and checking if $\mathcal{P}_i(I)$ contains at least one $p \in W$. $\mathcal{P}_i(I)$ is called the primal shape, which is defined as the set $$\mathcal{P}_i(I) = \{x \in \mathbb{R}^3 \mid (\theta,t) \in I \text{ with } x \in R_\theta C_i + t\}. \quad (27)$$

Using the above definition for the primal shape, equation (24) is computed as $$f_{i,up}(I) = \begin{cases} 1 & \text{if } \exists\, p \in W \text{ with } p \in \mathcal{P}_i(I) \\ 0 & \text{otherwise.} \end{cases} \quad (28)$$

Thus, the computation of the max of $f_i$ over I is equivalent to performing a series of point-in-shape tests $p \in P_i(I)$. Minkowski space is used to compute the primal shape.

The Minkowski sum between two sets A and B is defined as $$A \oplus B = \{a+b \mid a \in A, b \in B\}. \quad (29)$$

Analogously, the Minkowski product between R and C is the set $$R \otimes C = \{Rc \mid R \in R, c \in C\}. \quad (30)$$

Based on the rotation and translational decomposition of I in equation (17), let $$T(I) = [x_0, x_1] \times [y_0, y_1] \times [z_0, z_1]. \quad (31)$$

Therefore, the primal shape can be computed as $$P_i(I) = (R_{[\theta_0,\theta_1]} \otimes C_i) \oplus T(I), \quad (32)$$

where $R_{[\theta_0,\theta_1]}$ is the set of rotations by an angle $\theta \in [\theta_0, \theta_1]$ around the world gravity vector $g_w$. The Minkowski product $R_{[\theta_0,\theta_1]} \otimes C_i$ is the set generated by rotating $C_i$ around $g_w$ by all angles in the range $[\theta_0, \theta_1]$ as shown in FIG. 6A. Placing the resulting set at each point in the box T(I) gives $P_i(I)$. As shown in FIG. 6, the primal shape 600 is illustrated from viewpoints 610, 620, and 630.

Figure 6B:
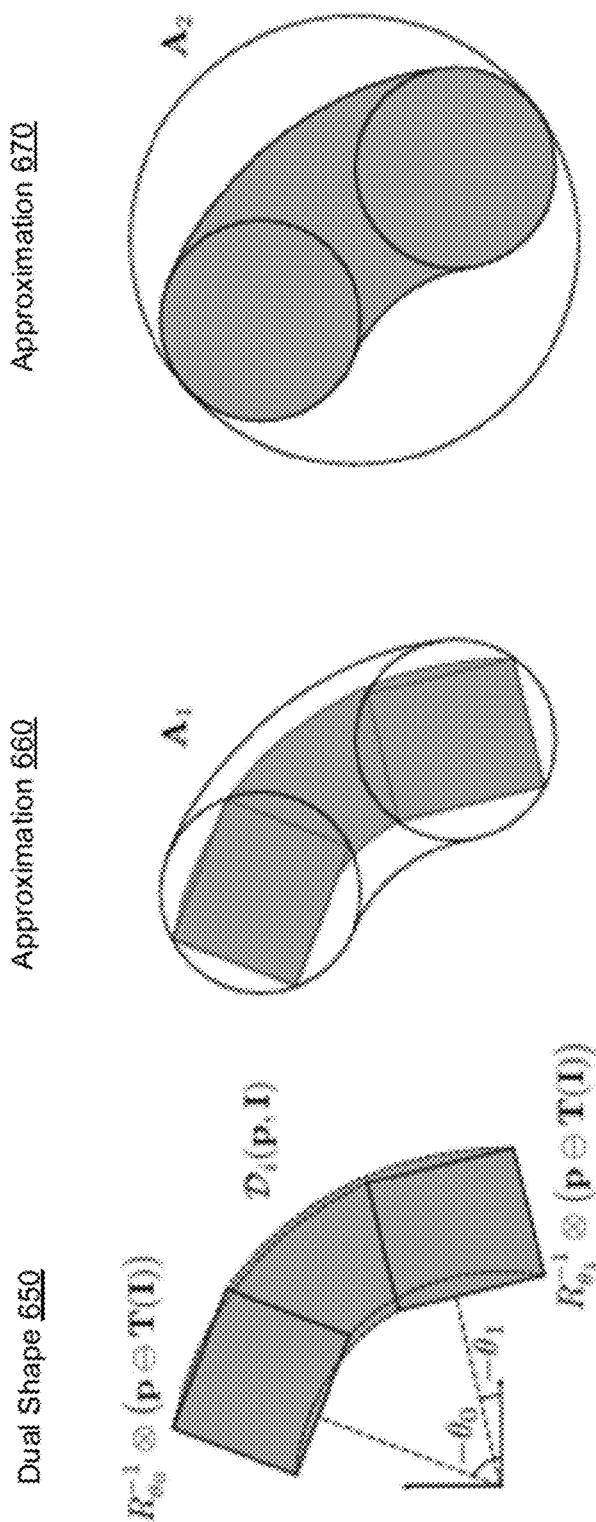
FIG. 6B shows a top-down illustration of a dual shape and associated approximations used to compute an upper-bound for the BNB search algorithm in FIG. 5 in accordance with some implementations.

FIG. 6B provides a top-down illustration of a dual shape 650 and associated approximations 660 and 670 used to compute an upper-bound for the BNB search algorithm 500 in FIG. 5 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 6B illustrates a dual shape 650, which is an alternative to the primal shape 600 described above with reference to FIG. 6A. Also shown in FIG. 6B are approximations 660 $A_1$ and 670 $A_2$ of the dual shape 650.

For a point $x \in \mathbb{R}^3$ and a set $A \subset \mathbb{R}^3$, define $$x \ominus A = \{x - a \mid a \in A\}. \quad (33)$$

It holds that $$p \in P_i(I) \Leftrightarrow p \in (R_{[\theta_0,\theta_1]} \otimes C_i) \oplus T(I) \quad (34)$$

$$p \in P_i(I) \Leftrightarrow (p \ominus T(I)) \cap (R_{[\theta_0,\theta_1]} \otimes C_i) \neq \emptyset \quad (35)$$

$$p \in P_i(I) \Leftrightarrow (R_{[\theta_0,\theta_1]}^{-1} \otimes (p \ominus T(I))) \cap C_i \neq \emptyset \quad (36)$$

$$p \in \mathcal{P}_i(I) \Leftrightarrow \mathcal{D}_i(p,I) \cap C_i \neq \emptyset, \quad (37)$$

where the dual shape is defined as $$\mathcal{D}_i(p,I) = R_{[\theta_0,\theta_1]}^{-1} \otimes (p \ominus T(I)). \quad (38)$$

To put the above equations (34)-(37) into words, a point is contained in the primal shape if and only if its generating cone intersects the dual shape. This means that we can replace the condition $p \in \mathcal{P}_i(I)$ in equation (28) with an equivalent condition $\mathcal{D}_i(p, I) \cap C_i \neq \emptyset$. Upper-bounds can be computed using dual shapes as $$f_{i,up}(I) = \begin{cases} 1 & \text{if } \exists\, p \in \mathcal{W} \text{ with } \mathcal{D}_i(p, I) \cap C_i \neq \emptyset \\ 0 & \text{otherwise.} \end{cases} \quad (39)$$

According to equation (38), the dual shape 650 is generated by continuously rotating the 3D box $p \ominus T(I)$ around the world gravity vector $g_w$ by all angles in the range $[-\theta_1, -\theta_0]$. The first step of the approximation is to replace the box by its circumscribed sphere $S_{circ}$. This results in approximating $\mathcal{D}_i(p, I)$ by the set $$A_1 = R_{[\theta_0, \theta_1]}^{-1} \otimes S_{circ}, \quad (40)$$

which consists of two spheres, $R_{\theta_0}^{-1} \otimes S_{circ}$ and $R_{\theta_1}^{-1} \otimes S_{circ}$, connected to each other by a piece of a torus as shown by approximation 660 $A_1$. The second step of the approximation is to approximate $A_1$ with the smallest sphere that contains $A_1$ as shown by approximation 670 $A_2$.

Replacing $\mathcal{D}_i(p, I)$ by $A_2$ in equation (39) leads to an alternative upper-bound computation $$\bar{f}_{i,up}(I) = \begin{cases} 1 & \text{if } \exists\, p \in \mathcal{W} \text{ with } A_2 \cap C_i \neq \emptyset \\ 0 & \text{otherwise,} \end{cases} \quad (41)$$

where the complex computation for $\mathcal{D}_i(p, I) \cap C_i$ is avoided in favor of a simpler cone-sphere intersection test.

Next, the validity of upper-bounds based on dual shapes is shown. Since the above constructions imply that $$\mathcal{D}_i(p, I) \subset A_1 \subset A_2, \quad (42)$$

it holds that $$\bar{f}_{i,up}(I) \geq f_{i,up}(I), \quad (43)$$

which makes $\bar{f}_{i,up}$ an upper-bound.

Finally, verifying that equation (20) holds for the dual shape is equivalent to showing $$\lim_{vol(I) \to 0} \bar{f}_{i,up}(I) = \max_{\substack{(\theta, t) \in I \\ vol(I) \to 0}} f_i(\theta, t), \, i = 1, \ldots, n. \quad (44)$$

Using the splitting procedure described above with reference to block 5-4 of the method 500 to shrink the volume of a 4D interval to zero makes the interval shrink to a single point. This point in 4D space is a particular transformation $(\theta, t)$. More formally, $$vol(I) \to 0 \Leftrightarrow I \to (\theta, t). \quad (45)$$

Replacing $I$ by $(\theta, t)$ yields $$\lim_{vol(I) \to 0} \bar{f}_{i,up}(I) = \bar{f}_{i,up}(\theta, t) \quad (46)$$

$$\max_{\substack{(\theta, t) \in I \\ vol(I) \to 0}} f_i(\theta, t) = f_i(\theta, t), \quad (47)$$

which reduces the verification of equation (44) to showing that $$\bar{f}_{i,up}(\theta, t) = f_i(\theta, t). \quad (48)$$

In the limit $vol(I) \to 0$, the dual shape $D_i(p, I)$ and its approximation $A_2$ are equal, as they both shrink to the same point in $\mathbb{R}^3$. More formally, $$\lim_{vol(I) \to 0} \mathcal{D}_i(p, I) = \lim_{vol(I) \to 0} A_2. \quad (49)$$

This means that in the limit, both $\bar{f}_{i,up}$ and $f_{i,up}$ compute the same upper-bound, i.e., $$\bar{f}_{i,up}(\theta, t) = f_{i,up}(\theta, t). \quad (50)$$

Using the fact that the primal shape shrinks to a cone based on the fact that $$\lim_{vol(I) \to 0} \mathcal{P}_i(I) = R_\theta C_i + t. \quad (51)$$

Equation (51) can be used to update equation (28) such that $$\lim_{vol(I) \to 0} f_{i,up}(I) = f_{i,up}(\theta, t) = \begin{cases} 1 & \text{if } \exists\, p \in \mathcal{W} \text{ with } p \in R_\theta C_i + t \\ 0 & \text{otherwise,} \end{cases} \quad (52)$$

which is the definition of $f_i(\theta, t)$ by equation (26). Finally, combining this with equation (50) yields $$\bar{f}_{i,up}(\theta, t) = f_{i,up}(\theta, t) = f_i(\theta, t), \quad (53)$$

which proves equation (48).

Figure 7:
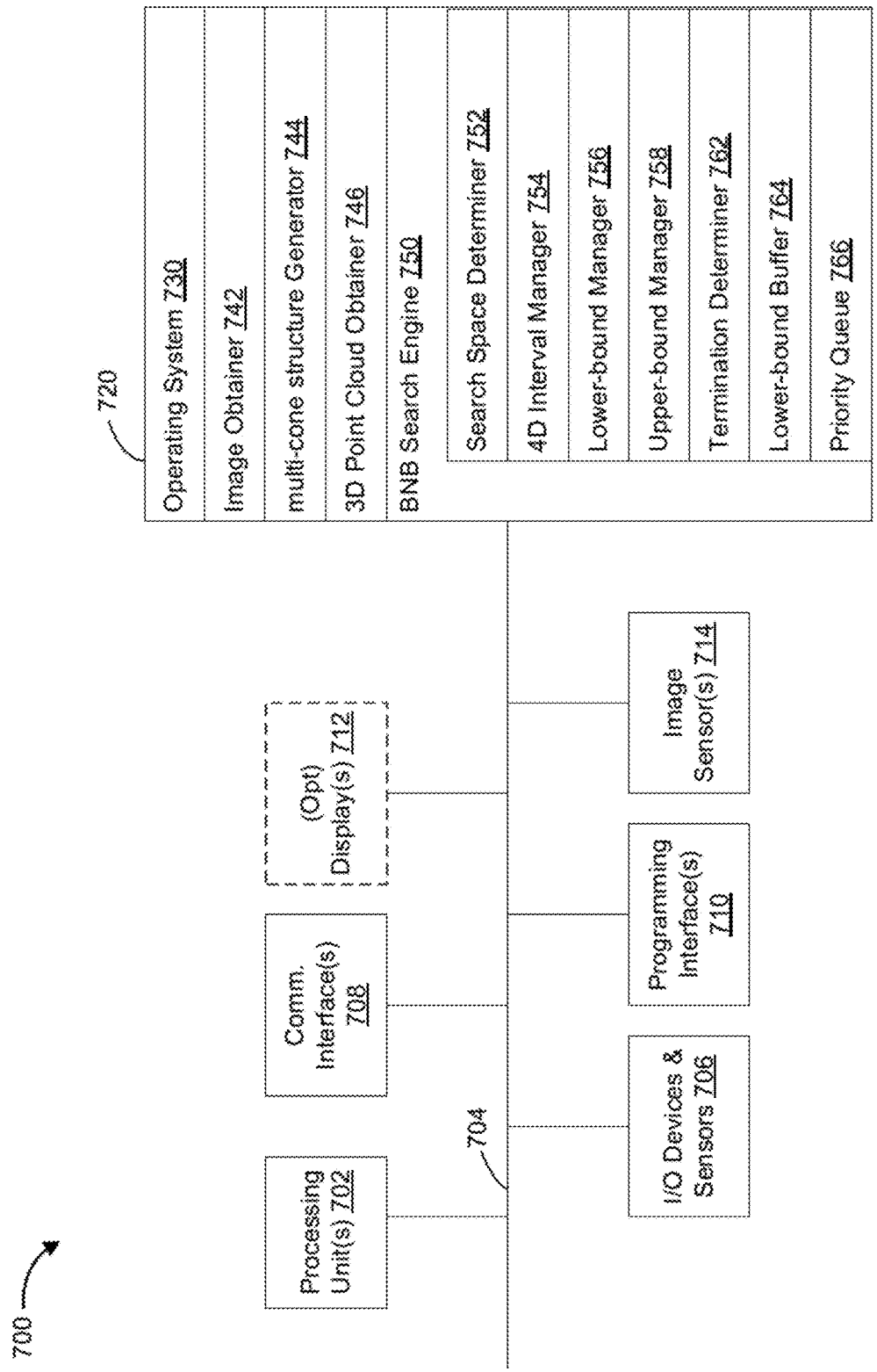
FIG. 7 is a block diagram of a device in accordance with some implementations.

FIG. 7 is a block diagram of an example of a device 700 (e.g., a digital camera, HMD, wearable computing device, mobile phone, tablet, laptop, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 700 includes one or more processing units 702 (e.g., microprocessors, ASICs, field-programmable gate arrays (FPGAs), graphics processing units (GPUs), central processing units (CPUs), processing cores, and/or the like), one or more input/output (I/O) devices and sensors 706, one or more communication interfaces 708 (e.g., Universal Serial Bus (USB), Institute of Electrical and Electronics Engineers (IEEE) 802.3x, IEEE 802.11x, IEEE 802.16x, Global System for Mobile communications (GSM), code-division multiple access (CDMA), time-division multiple access (TDMA), Global Positioning System (GPS), infrared (IR), BLUETOOTH, ZIGBEE, and/or the like type interface), one or more programming interfaces 710 (e.g., input/output (I/O) ports), one or more optional displays 712, one or more image sensors 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more optional displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more optional displays 712 correspond to diffractive, reflective, polarized, holographic, etc. waveguide displays.

In some implementations, the one or more image sensors 714 are configured to obtain image data relative to a scene. For example, the one or more image sensors 714 correspond to one or more RGB cameras (e.g., with a complementary metal-oxide-semiconductor (CMOS) image sensor or a charge-coupled device (CCD) image sensor), infrared (IR) image sensors, event-based cameras, and/or the like. In some implementations, the device 700 also includes one or more optional depth sensors correspond to a structured light device, a time-of-flight device, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730, an image obtainer 742, a multi-cone structure generator 744, a 3D point cloud obtainer 746, and a BNB search engine 750.

The operating system 730 includes procedures for handling various basic system services and for performing hardware dependent tasks.

In some implementations, the image obtainer 742 is configured to obtain (e.g., receive, retrieve, or capture) a reference image associated with a scene. To that end, in various implementations, the image obtainer 742 includes instructions and/or logic therefor, and heuristics and metadata therefor.

In some implementations, the multi-cone structure generator 744 is configured to: (i) extract key-points from the reference image; (ii) generate key-point vectors based on the key-points; (iii) determine a camera origin based on the key-point vectors and intrinsic parameters of a camera that captured the reference image; (iv) generate to multi-cone structure including a plurality of cones, wherein an apex of the plurality of cones corresponds to the camera origin, an axis of each of the plurality of cones is associated with one of the key-point vectors, and each axis of the plurality of cones intersects one of the key-points; and (v) align the multi-cone structure based on a nominal alignment vector (e.g., a world gravity direction vector). To that end, in various implementations, the multi-cone structure generator 744 includes instructions and/or logic therefor, and heuristics and metadata therefor.

In some implementations, the 3D point cloud obtainer 746 is configured to obtain (e.g., receive, retrieve, or generate) a 3D point cloud associated with the scene. To that end, in various implementations, the 3D point cloud obtainer 746 includes instructions and/or logic therefor, and heuristics and metadata therefor.

In some implementations, the BNB search engine 750 is configured to determine a rigid transformation (R, t) within a search space $\mathcal{S}$ for the aligned multi-cone structure such that the number of transformed cones that contain at least one point in the 3D point cloud $\mathcal{W}$ is maximal. In some implementations, the BNB search engine 750 includes a search space determiner 752, a 4D interval manager 754, a lower-bound manager 756, an upper-bound manager 758, a termination determiner 762, a lower-bound buffer 764, and a priority queue 766.

In some implementations, the lower-bound buffer 764 stores the current highest lower-bound value $f^*_{low}$. In some implementations, the priority queue 766 stores one or more 4D interval+upper-bound pairs.

In some implementations, the search space determiner 752 is configured to determine a search space S based at least in part on a translation space T. To that end, in various implementations, the search space determiner 752 includes instructions and/or logic therefor, and heuristics and metadata therefor.

In some implementations, the 4D interval manager 754 is configured to: (i) select a 4D interval from the priority queue 766 that is associated with a highest upper-bound value; and (ii) divide (e.g., bisect) the selected 4D interval into two or more 4D sub-intervals. To that end, in various implementations, the 4D interval manager 754 includes instructions and/or logic therefor, and heuristics and metadata therefor.

In some implementations, the lower-bound manager 756 is configured to: (i) generate a lower-bound value for each of the two or more 4D sub-intervals; and (ii) determine whether to update the lower-bound buffer 764 with either of the lower-bound values for the two or more 4D sub-intervals. To that end, in various implementations, the lower-bound manager 756 includes instructions and/or logic therefor, and heuristics and metadata therefor.

In some implementations, the upper-bound manager 758 is configured to: (i) generate an upper-bound value for each of the two or more 4D sub-intervals; and (ii) determine whether to add either of the two or more 4D sub-intervals to the priority queue 766 based on a comparison between the upper-bound values for the two or more 4D sub-intervals and the current highest lower-bound value $f^*_{low}$ in the lower-bound buffer 764. To that end, in various implementations, the upper-bound manager 758 includes instructions and/or logic therefor, and heuristics and metadata therefor.

In some implementations, the termination determiner 762 is configured to terminate the BNB search algorithm according to a determination that one of the one or more 4D intervals in the priority queue 766 satisfies the termination criteria. To that end, in various implementations, the termination determiner 762 includes instructions and/or logic therefor, and heuristics and metadata therefor.

Moreover, FIG. 7 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device including one or more processors and a non-transitory memory:
extracting a plurality of key-points from a reference image associated with a scene;
generating a multi-cone structure including a plurality of cones based on the plurality of key-points and intrinsic parameters associated with a camera that captured the reference image, wherein an apex of the plurality of cones corresponds to a camera origin point associated with the reference image, and wherein each axis of the plurality of cones intersects a respective key-point from the plurality of key-points;
aligning the multi-cone structure based on a nominal alignment vector in order to restrict two of three rotational degrees of freedom associated with the multi-cone structure;
determining a plurality of candidate rigid transformations for the multi-cone structure, each including a value for a remaining rotational degree of freedom and values for three translational degrees of freedom, within a search space associated with the scene; and
selecting a particular rigid transformation from among the plurality of candidate rigid transformations that causes a greatest number of the plurality of cones within the multi-cone structure to include at least one point in a three-dimensional (3D) point cloud associated with the scene.

2. The method of claim 1, wherein determining the plurality of candidate rigid transformations for the multi-cone structure includes performing a branch-and-bound (BNB) search algorithm over the search space based on four-dimensional (4D) intervals of the search space, wherein each 4D interval is associated with a candidate range of values for the remaining rotational degree of freedom and candidate ranges of values for the three translational degrees of freedom, and wherein each 4D interval is associated with one of the plurality of candidate rigid transformations.

3. The method of claim 2, wherein performing the BNB search algorithm includes:
selecting a respective 4D interval from a priority queue including one or more 4D intervals;
dividing the respective 4D interval into two or more 4D sub-intervals;
generating a lower-bound value for each of the two or more 4D sub-intervals;
determining whether to update a current highest lower-bound value in a lower-bound buffer based on the lower-bound values for the two or more 4D sub-intervals;
generating an upper-bound value for each of the two or more 4D sub-intervals;
determining whether to add either of the two or more 4D sub-intervals to the priority queue based on a comparison between the upper-bound values for the two or more 4D sub-intervals and the current highest lower-bound value in the lower-bound buffer;
determining whether one of the one or more 4D intervals in the priority queue satisfies termination criteria; and
in response to determining that one of the one or more 4D intervals in the priority queue satisfies the termination criteria, setting the rigid transformation used to compute the current highest lower-bound value in the lower-bound buffer as the particular rigid transformation for the multi-cone structure that causes the greatest number of the plurality of cones within the multi-cone structure to include at least one point in the 3D point cloud associated with the scene.

4. The method of claim 3, wherein selecting the respective 4D interval from the priority queue includes selecting a 4D interval from the priority queue that is associated with a highest upper-bound value.

5. The method of claim 3, wherein dividing the respective 4D interval includes bisecting a respective dimension of the respective 4D interval, wherein the respective dimension is associated with a greatest ratio between a current value for the respective dimension and an initial value for the respective dimension.

6. The method of claim 3, wherein the lower-bound values for the two or more 4D sub-intervals correspond to integer values.

7. The method of claim 3, wherein the upper-bound values for the two or more 4D sub-intervals correspond to integer values.

8. The method of claim 3, wherein generating the upper-bound value for a first 4D sub-interval from the two or more 4D sub-intervals includes:
generating a plurality of primal shapes each associated with one of the plurality of cones by continuously transforming each of the plurality of cones by all transformations of the first 4D sub-interval; and
determining how many of the plurality of primal shapes intersect at least one cone of the plurality of cones in the multi-cone structure.

9. The method of claim 3, wherein generating the upper-bound value for a first 4D sub-interval from the two or more 4D sub-intervals includes:
generating a plurality of dual shapes each associated with one of the plurality of cones by rotating a 3D cube around the nominal alignment vector by all angles corresponding to the remaining rotational degree of freedom associated with the first 4D sub-interval; and
determining how many of the plurality of dual shapes intersect at least one cone of the plurality of cones in the multi-cone structure.

10. The method of claim 9, wherein each of the plurality of dual shapes is approximated by replacing the 3D cube with a circumscribed sphere.

11. The method of claim 10, wherein each of the plurality of dual shapes is approximated by determining a sphere containing the dual shape approximation generated by replacing the 3D cube with the circumscribed sphere.

12. The method of claim 3, further comprising:
in response to determining that the one or more 4D intervals in the priority queue do not satisfy the termination criteria, repeating performance of the BNB search algorithm by selecting a subsequent 4D interval from the priority queue.

13. The method of claim 1, further comprising:
obtaining the reference image that is characterized by the intrinsic parameters associated with the camera that captured the reference image.

14. The method of claim 1, further comprising:
obtaining the 3D point cloud associated with the scene, wherein the plurality of key-points within the reference image corresponds to 3D points within the 3D point cloud.

15. The method of claim 1, wherein the nominal alignment vector corresponds to a world gravity direction vector.

16. The method of claim 15, further comprising:
determining the world gravity direction vector based on information an inertial measurement unit (IMU).

17. The method of claim 15, further comprising:
determining the world gravity direction vector by performing one or more computer vision techniques on the reference image.

18. A device comprising:
one or more processors;
a non-transitory memory; and
one or more programs stored in the non-transitory memory, which, when executed by the one or more processors, cause the device to:
extract a plurality of key-points from a reference image associated with a scene;
generate a multi-cone structure including a plurality of cones based on the plurality of key-points and intrinsic parameters associated with a camera that captured the reference image, wherein an apex of the plurality of cones corresponds to a camera origin point associated with the reference image, and wherein each axis of the plurality of cones intersects a respective key-point from the plurality of key-points;
align the multi-cone structure based on a nominal alignment vector in order to restrict two of three rotational degrees of freedom associated with the multi-cone structure;
determine a plurality of candidate rigid transformations for the multi-cone structure, each including a value for a remaining rotational degree of freedom and values for three translational degrees of freedom, within a search space associated with the scene; and
select a particular rigid transformation from among the plurality of candidate rigid transformations that causes a greatest number of the plurality of cones within the multi-cone structure to include at least one point in a three-dimensional (3D) point cloud associated with the scene.

19. The device of claim 18, wherein determining the plurality of candidate rigid transformations for the multi-cone structure includes performing a branch-and-bound (BNB) search algorithm over the search space based on four-dimensional (4D) intervals of the search space, wherein each 4D interval is associated with a candidate range of values for the remaining rotational degree of freedom and candidate ranges of values for the three translational degrees of freedom, and wherein each 4D interval is associated with one of the plurality of candidate rigid transformations.

20. The device of claim 19, wherein performing the BNB search algorithm includes:
selecting a respective 4D interval from a priority queue including one or more 4D intervals;
dividing the respective 4D interval into two or more 4D sub-intervals;
generating a lower-bound value for each of the two or more 4D sub-intervals;
determining whether to update a current highest lower-bound value in a lower-bound buffer based on the lower-bound values for the two or more 4D sub-intervals;
generating an upper-bound value for each of the two or more 4D sub-intervals;
determining whether to add either of the two or more 4D sub-intervals to the priority queue based on a comparison between the upper-bound values for the two or more 4D sub-intervals and the current highest lower-bound value in the lower-bound buffer;
determining whether one of the one or more 4D intervals in the priority queue satisfies termination criteria; and
in response to determining that one of the one or more 4D intervals in the priority queue satisfies the termination criteria, setting the rigid transformation used to compute the current highest lower-bound value in the lower-bound buffer as the particular rigid transformation for the multi-cone structure that causes the greatest number of the plurality of cones within the multi-cone structure to include at least one point in the 3D point cloud associated with the scene.

21. A non-transitory memory storing one or more programs, which, when executed by one or more processors of a device, cause the device to:
- extract a plurality of key-points from a reference image associated with a scene;
- generate a multi-cone structure including a plurality of cones based on the plurality of key-points and intrinsic parameters associated with a camera that captured the reference image, wherein an apex of the plurality of cones corresponds to a camera origin point associated with the reference image, and wherein each axis of the plurality of cones intersects a respective key-point from the plurality of key-points;
- align the multi-cone structure based on a nominal alignment vector in order to restrict two of three rotational degrees of freedom associated with the multi-cone structure;
- determine a plurality of candidate rigid transformations for the multi-cone structure, each including a value for a remaining rotational degree of freedom and values for three translational degrees of freedom, within a search space associated with the scene; and
- select a particular rigid transformation from among the plurality of candidate rigid transformations that causes a greatest number of the plurality of cones within the multi-cone structure to include at least one point in a three-dimensional (3D) point cloud associated with the scene.

22. The non-transitory memory of claim 21, wherein determining the plurality of candidate rigid transformations for the multi-cone structure includes performing a branch-and-bound (BNB) search algorithm over the search space based on four-dimensional (4D) intervals of the search space, wherein each 4D interval is associated with a candidate range of values for the remaining rotational degree of freedom and candidate ranges of values for the three translational degrees of freedom, and wherein each 4D interval is associated with one of the plurality of candidate rigid transformations.

23. The non-transitory memory of claim 22, wherein performing the BNB search algorithm includes:
- selecting a respective 4D interval from a priority queue including one or more 4D intervals;
- dividing the respective 4D interval into two or more 4D sub-intervals;
- generating a lower-bound value for each of the two or more 4D sub-intervals;
- determining whether to update a current highest lower-bound value in a lower-bound buffer based on the lower-bound values for the two or more 4D sub-intervals;
- generating an upper-bound value for each of the two or more 4D sub-intervals;
- determining whether to add either of the two or more 4D sub-intervals to the priority queue based on a comparison between the upper-bound values for the two or more 4D sub-intervals and the current highest lower-bound value in the lower-bound buffer;
- determining whether one of the one or more 4D intervals in the priority queue satisfies termination criteria; and
- in response to determining that one of the one or more 4D intervals in the priority queue satisfies the termination criteria, setting the rigid transformation used to compute the current highest lower-bound value in the lower-bound buffer as the particular rigid transformation for the multi-cone structure that causes the greatest number of the plurality of cones within the multi-cone structure to include at least one point in the 3D point cloud associated with the scene.

* * * * *